US012259947B2

(12) United States Patent
Yim

(10) Patent No.: US 12,259,947 B2
(45) Date of Patent: Mar. 25, 2025

(54) GENERATING A SELECTABLE SUGGESTION USING A PROVISIONAL MACHINE LEARNING MODEL WHEN USE OF A DEFAULT SUGGESTION MODEL IS INCONSEQUENTIAL

(71) Applicant: Google LLC, Mountain View, CA (US)

(72) Inventor: Keun Soo Yim, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 935 days.

(21) Appl. No.: 17/252,218

(22) PCT Filed: May 29, 2020

(86) PCT No.: PCT/US2020/035290
§ 371 (c)(1),
(2) Date: Dec. 14, 2020

(87) PCT Pub. No.: WO2021/242257
PCT Pub. Date: Dec. 2, 2021

(65) Prior Publication Data
US 2022/0147775 A1 May 12, 2022

(51) Int. Cl.
G06F 18/21 (2023.01)
G06N 20/20 (2019.01)
(Continued)

(52) U.S. Cl.
CPC ......... G06F 18/2178 (2023.01); G06N 20/20 (2019.01); H04L 51/02 (2013.01); H04L 51/046 (2013.01)

(58) Field of Classification Search
CPC .......... G06N 20/00; G06N 20/20; G06N 5/04; H04L 51/02
See application file for complete search history.

(56) References Cited

U.S. PATENT DOCUMENTS 8,554,700 B2 * 10/2013 Kanungo ............. G06F 16/248
707/707
10,726,359 B1 * 7/2020 Drouin .................. G16H 50/30
(Continued)

FOREIGN PATENT DOCUMENTS

CN 110083542 8/2019
CN 110310168 10/2019

OTHER PUBLICATIONS

European Patent Office; International Search Report and Written Opinion of Ser. No. PCT/US2020/035290; 9 pages; dated Feb. 3, 2021.
(Continued)

Primary Examiner — Abdullah Al Kawsar
Assistant Examiner — Tewodros E Mengistu
(74) Attorney, Agent, or Firm — Gray Ice Higdon

(57) ABSTRACT

Implementations set forth herein relate to selectively relying on additional suggestion model(s) when generating selectable suggestions, while also maintaining access to a default suggestion model. The selectable suggestions can be generated using one or more additional multi-domain machine learning (ML) models, which can be optionally available to the client application, regardless of whether a default suggestion model remains useful for generating suitable suggestions. In some implementations, as the client application employs various additional multi-domain ML models, a particular model can be identified as improving suggestions for the client application, at least based on user feedback and/or other data. The particular model can then be selected to replace and/or supplement the default suggestion model, in order to provide more accurate suggestions that, when selected, initialize actions that can preserve time and computational resources.

20 Claims, 7 Drawing Sheets

(51) Int. Cl.
   *H04L 51/02*    (2022.01)
   *H04L 51/046*   (2022.01)

(56) References Cited

U.S. PATENT DOCUMENTS

| | | | |
|---|---|---|---|
| 2012/0246336 A1* | 9/2012 | Sathish ................. | G06F 9/5055 |
| | | | 709/238 |
| 2016/0300150 A1* | 10/2016 | Watts-Fitzgerald ... | G08G 1/012 |
| 2017/0098159 A1 | 4/2017 | Sharifi et al. | |
| 2017/0242886 A1 | 8/2017 | Jolley et al. | |
| 2018/0239770 A1 | 8/2018 | Ghotbi et al. | |
| 2019/0007228 A1 | 1/2019 | Vuskovic et al. | |
| 2019/0236417 A1* | 8/2019 | Yun ....................... | G06F 18/251 |
| 2021/0117977 A1* | 4/2021 | Kim ...................... | G06F 18/214 |
| 2021/0125025 A1* | 4/2021 | Kuo ....................... | G06N 5/04 |
| 2021/0365806 A1* | 11/2021 | Sumanth ............... | G06N 20/00 |

OTHER PUBLICATIONS

China National Intellectual Property Administration; Notification of First Office Action issued in Application No. 202080101369.5; 21 pages; dated Aug. 28, 2024.
China National Intellectual Property Administration; Notification of Second Office Action issued in Application No. 202080101369.5; 15 pages; dated Jan. 16, 2025.

* cited by examiner

GENERATING A SELECTABLE SUGGESTION USING A PROVISIONAL MACHINE LEARNING MODEL WHEN USE OF A DEFAULT SUGGESTION MODEL IS INCONSEQUENTIAL

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some contexts, a user may be presented with selectable suggestions for causing a computing device to perform a particular operation, such as invoking an automated assistant to initialize an action. Such suggestions can be based on application content that is being rendered at the computing device when the user is, for example, sending messages, browsing the internet, and/or otherwise interacting with an application. Although some applications can include native modules or application programming interfaces (APIs) for generating such suggestions, there may be instances when a process for generating suggestions is inadequate. For instance, text of correspondence between users, when processed using a previously employed suggestion model, may not result in any suitable suggestion(s) being surfaced at an interface of the computing device (e.g., at an interface of the application and/or an interface of the automated assistant).

Such instances can result in missed opportunities for a user to initialize an automated assistant, or other application, to complete a task that preserves time, energy, and other resources. Furthermore, despite a default suggestion model being advantageous in certain contexts, updates to the default suggestion model (or replacement of the default suggestion model with a superseding suggestion model) may not be frequently pushed to user devices. This lack of expeditious model updating and/or model replacement can prevent time and/or energy saving action suggestion(s) from being identified. These suggestions may be determined using updated suggestion model(s) but not using default suggestion model(s). Updated suggestion model(s) can be more robust than (e.g., provide greater coverage than) default suggestion model(s). However, while such updated suggestion models can be more robust, they may lack accuracy and can interrupt other services if deployed too quickly (e.g., prior to sufficient training and/or validation). Such lack of accuracy and service interruptions can also lead to waste of various devices and/or network resources when inaccurate suggestion(s) are rendered and/or selected.

SUMMARY

Implementations set forth herein relate to selectively relying on additional suggestion model(s) when generating selectable suggestions that relate to application content generated by a client application. The client application may otherwise employ a suggestion process (e.g., a rules-based approach, application suggestion model, and/or other processes) for rendering selectable suggestions to a user. A selectable suggestion can be, for example, a selectable graphical user interface element that, when selected, causes another application to initialize an action. For instance, the client application can be a messaging application that renders a selectable GUI element that, when selected, causes an automated assistant to initialize an action (e.g., scheduling an event). The action can, with prior permission from users, be based on content of a conversation between users of the messaging application. In order to identify a particular action to suggest, the messaging application or a separate application (e.g., an automated assistant) can process certain application content using an application suggestion model, which may be a default model associated with the automated assistant. In some instances, when the automated assistant relies on a suggestion model that has not been adequately tested, latency and mismanagement of computational resources can result. In order to ensure an efficient transition between suggestion models, a default suggestion model can remain available for use when generating suggestions, and other additional suggestion models can be concurrently, and/or additionally, relied upon under certain conditions.

For example, a user can be using the messaging application to communicate with another user regarding a particular event. The particular event can be characterized by application content that is being rendered at an interface of the messaging application. A first suggestion model can be relied upon by default when processing the application content, in furtherance of rendering a selectable suggestion element for the user. In some implementations, the processing of the application content using the first suggestion model can result in, for example, one or more automated assistant commands suggested for the user to invoke. However, when the processing does, or does not, result in any suggestions being identified, and/or any suggestions with a threshold probability and/or threshold score being identified, a second suggestion model that can be used to assist with identifying suggestions to render.

In some implementations, the application content can be further processed using the second suggest model in order to generate one or more selectable suggestions for the user. For example, an automated assistant can employ the second suggestion mode, and/or one or more additional suggestion models, to assist with identifying one or more assistant actions that may be useful to the user and/or otherwise preserve computational resources. When the automated assistant identifies an assistant action or other content for the messaging application to suggest, the automated assistant can communicate the assistant action or other content to the messaging application. In response, the messaging application can elect to render, for example, a selectable suggestion element that identifies an assistant action that was identified using the second suggestion model. In this way, the messaging application can continue to rely on suggestions that were generated using a default process for rendering suggestions (e.g., using the first suggestion model), but also selectively transition to relying on other additional suggestion models that are available via the automated assistant or other application.

In some implementations, a first application can be tasked with selecting a suitable additional suggestion model from multiple different additional suggestion models. The first application can be provided at a client computing device along with a second application, which can provide an interface through which a user can receive suggestions. The first application can be updated over a network connection to allow client applications to have access to additional suggestion models that have recently become available. The second application can optionally be updated over the network connection, and can attempt to generate suggestions for users regardless of whether the first application is updated. For example, the second application can employ an application programming interface (API) for interfacing with the first application in order to receive suggestion data from the first application. Initially, the second application can execute a function such as assistant_suggestion(application_content( ), application_suggestion_model) in order to receive a suggestion that is based on application content and an application suggestion model. The slot value "application_content( )" can refer to the application content generated by the second application, and the slot value "application_suggestion_model" can identify a model that will be used by the first application when processing the application content. The first application can support the "application_suggestion_model" even after the first application is updated to provide access to one or more different additional suggestion models.

For instance, when the updated first application receives a request from the second application in furtherance of executing the function, the updated first application can process the "application_content( )" in furtherance of providing suggestion data to the second application. In some implementations, when processing of the "application_content( )" using the "application_suggestion_model" fails to result in identification of a suggestion, the second application can elect to not render a suggestion based on the application content. However, the first application can optionally use the "application content( )" along with another model, in order to continue to identify suggestions. For example, based on the application content, the first application can identify one or more additional suggestion models to employ when generating suggestions from the application content. In some implementations, an additional suggestion model can be viewed as an "experimental model" by an entity that provides the first application, and therefore the entity may avoid designating the additional suggestion model as a default model without prior testing. Therefore, by allowing the first application to use the additional suggestion model to generate suggestion data, the additional suggestion model can be tested without substantially affecting operability of a second application that otherwise relies on a different application suggestion model. In other words, an entity that provides models for the second application can test and/or train other suggestion models without necessitating that, during testing, access to an otherwise suitable application suggestion model be entirely revoked.

When the first application has identified a suitable additional suggestion model to test, the first application can generate suggestion data using both the additional suggestion model and the application content—despite the second application not requesting the first application to expressly employ the additional suggestion model. The second application can then determine whether to render one or more selectable suggestion elements based on the suggestion data. In some implementations, when the second application renders a selectable suggestion element using a particular additional suggestion model, user feedback (e.g., input and/or other user engagement) can be identified. The user feedback, with prior permission from a user, can be embodied as feedback data that is accessible to the first application and/or an entity that provides the first application. That particular additional suggestion model can then be further trained based on feedback data from a variety of different devices and/or user interactions. This can refine an accuracy of user suggestions that can be rendered by a particular application that uses the additional suggestion model.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
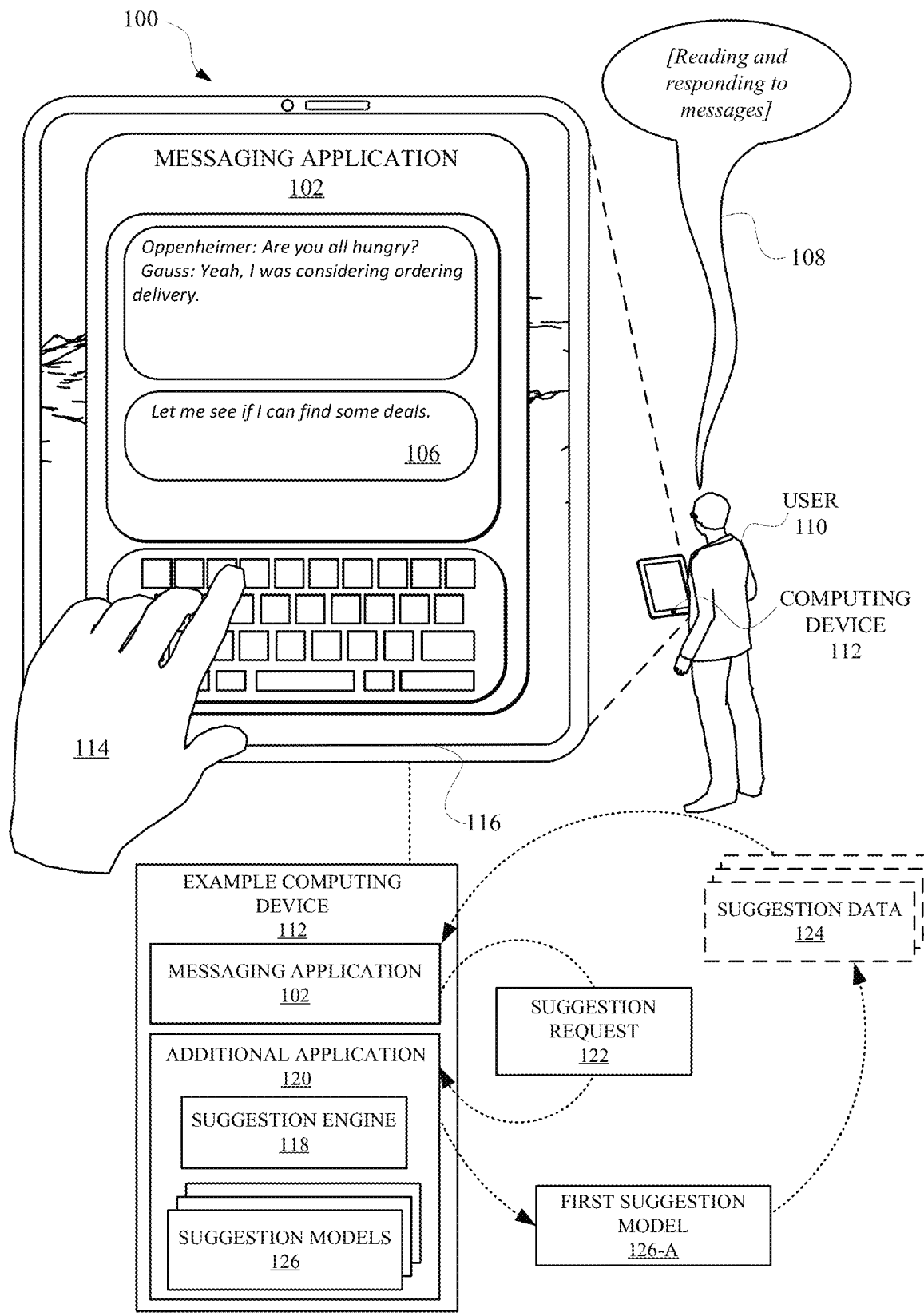
FIG. 1A, FIG. 1B, and FIG. 1C illustrate views of a user interacting with the computing device that can use one or more suggestion models to perform trial processes for generating suggestions, while simultaneously supporting one or more existing default suggestion models.
Figure 1B:
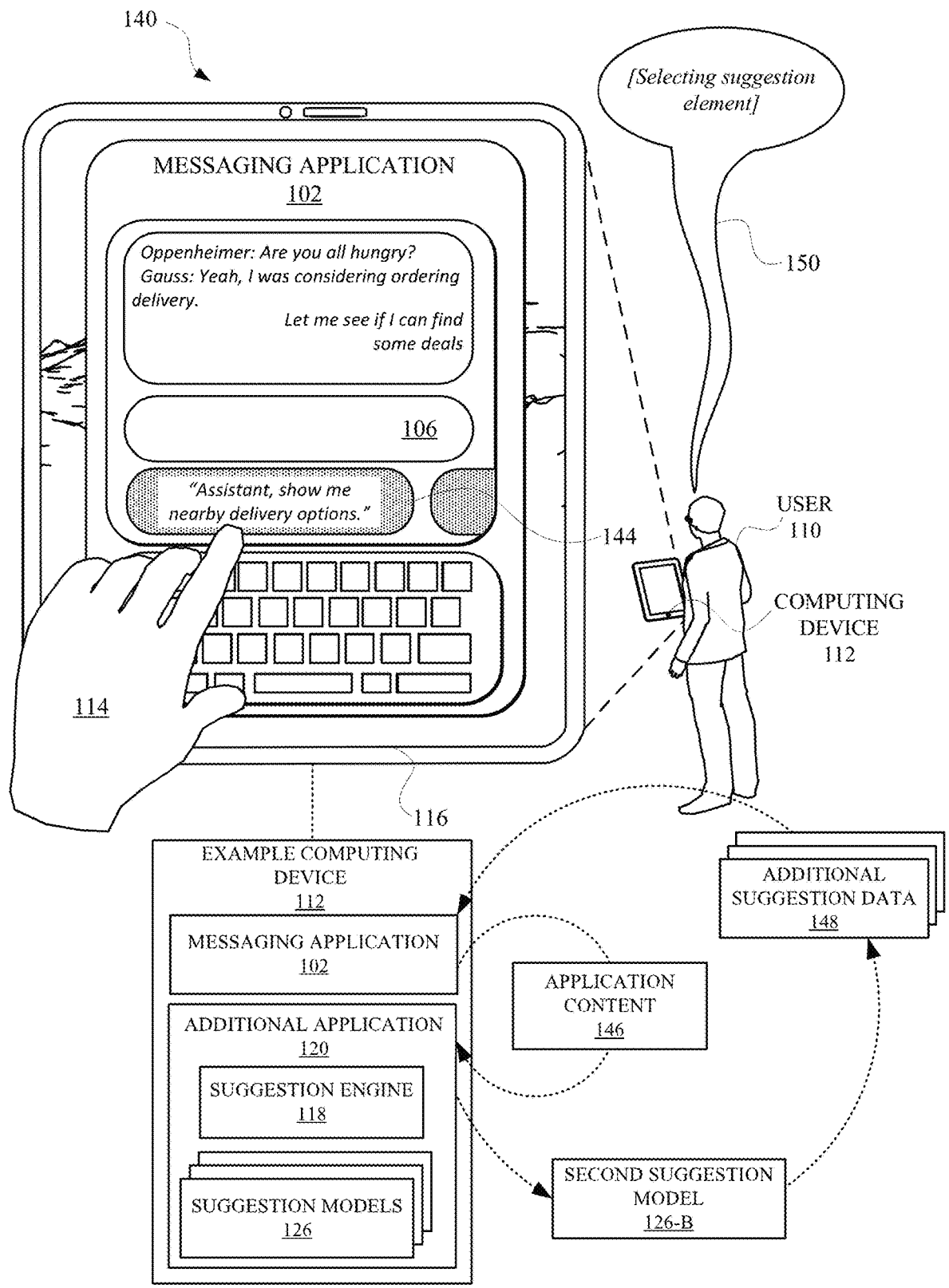
Figure 1C:
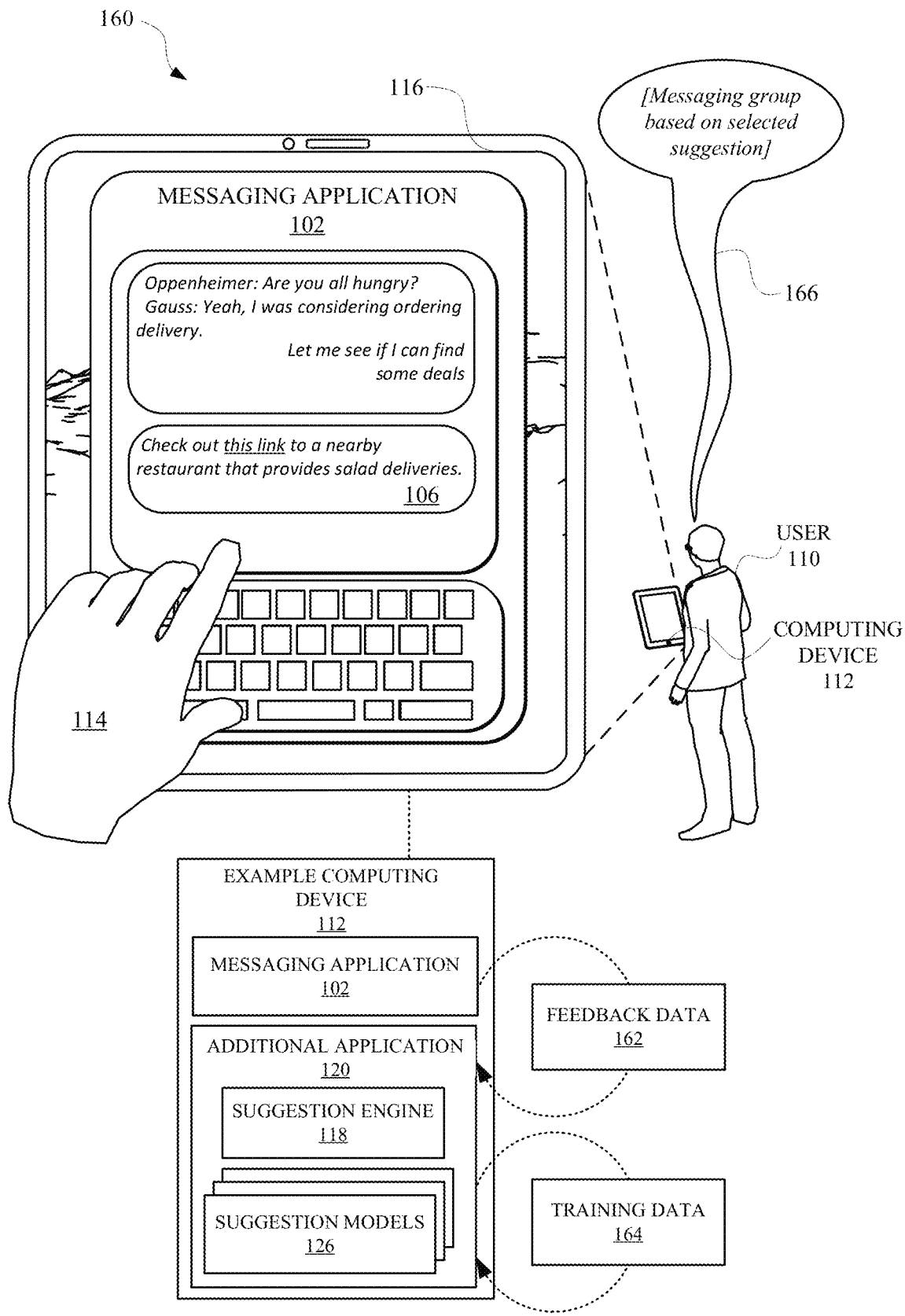

FIG. 1A, FIG. 1B, and FIG. 1C illustrate a view 100, a view 140, and a view 160 of a user 110 interacting with the example computing device 112 that can use one or more suggestion models to perform trial processes for generating suggestions—while simultaneously supporting one or more existing default suggestion models. For example, FIG. 1A illustrates a view 100 of the user 110 interacting with the example computing device 112 in order to access a messaging application 102. While interacting with the example computing device 112, the messaging application 102 can render application content, such as natural language content of a group message between the user 110 and one or more other persons, as indicated by status 108. The user 110 can use their hand 114 to input natural language content into a field 106 of the messaging application 102. One or more portions of content (e.g., text displayed at interface 116) rendered at the interface 116 can be considered application content, which can be a basis for one or more suggestions that can be rendered at an interface 116 of the example computing device 112. A suggestion can be rendered as a selectable suggestion element that, when selected, can cause one or more applications to operate in furtherance of assisting the user with an operation relevant to the application content. For example, a selectable suggestion element can include content that can be: provided as a spoken command to an automated assistant, incorporated into an input field of an application, communicated to another device and/or application, and/or otherwise used to assist the user 110 and/or apparatus or module with one or more operations.

In some implementations, the messaging application 102 can request suggestion data 124 by communicating a suggestion request 122 to an additional application 120 that is accessible via the example computing device 112. In response to receiving the suggestion request 122, the additional application 120 can access a first suggestion model 126-A of one or more different suggestion models 126. In some implementations, the additional application 120 and/or the messaging application 102 can identify the first suggestion model 126-A based on the first suggestion model 126-A having been previously used when processing prior application content and/or generating one or more suggestions for the messaging application 102. Additionally, or alternatively, the additional application 120 and/or the messaging application 102 can identify the first suggestion model 126-A based on the first suggestion model 126-A being designated as a default model for use when processing application content and generating one or more suggestions for the messaging application 102.

In some implementations, the additional application 120 can include a suggestion engine 118 that employs one or more suggestion models when generating suggestion data 124 for the messaging application 102. Additionally, or alternatively, the suggestion data 124 can be used by the messaging application 102 and/or the additional application 120 to render one or more selectable suggestion elements at an interface of the example computing device 112. In some implementations, the additional application 120 may generate suggestion data 124 using the first suggestion model 126-A but determine that the suggestion data 124 does not identify suggestions suitable for rendering to the user 110. For example, one or more suggestions can be assigned a probability that does not satisfy a threshold that is established based on one or more user interactions with various selectable suggestion elements. Additionally, or alternatively, the additional application 120 may attempt to generate suggestion data using the first suggestion model 126-A, but the process of generating the suggestion data may not result in an identifiable suggestion.

When the additional application 120 fails to identify one or more suggestions, or fails to identify one or more suggestions suitable for rendering at the interface 116, the additional application 120 and/or the messaging application 102 can employ a different suggestion model in order to identify other suggestions (e.g., corresponding to one or more other actions). In some implementations, the additional application 120 can generate suggestion data using a different suggestion model(s) without an express request from the messaging application 102 to (i) use the different suggestion model and/or (ii) attempt to generate other suggestion data. Additionally, or alternatively, the additional application 120 can generate suggestion data using application content when the suggestion data 124 is determined to be suitable for rendering to the user 110.

As provided in view 140 of FIG. 1B, the additional application 120 can access application content 146, which can characterize content of the interface 116 provided in FIG. 1A and/or in FIG. 1B. The additional application 120 can process the application content 146 using a second suggestion model 126-B. The second suggestion model 126-B can be different from the first suggestion model 126-A and can optionally be trained using at least some amount of training data that was not used to train the first suggestion model 126-A. Additionally, or alternatively, the second suggestion model 126-B can be a machine learning model that is a different type of machine learning model than that of the first suggestion model 126-A. For example, the second suggestion model 126-B can be a multi-domain neural network model and the first suggestion model 126-A may not be a multi-domain neural network model.

The additional application 120 can generate additional suggestion data 148 based on processing the application content 146 using the suggestion engine 118 and the second suggestion model 126-B. The additional suggestion data 148 can be provided by the additional application 120 to the messaging application 102, and the messaging application 102 can render one or more selectable suggestion elements 144 based on the additional suggestion data 148. Additionally, or alternatively, the additional application 120 can generate the additional suggestion data 148 to render one or more selectable suggestion elements 144 based on the additional suggestion data 148. The user 110 can select a selectable suggestion element 144 (as indicated by status 150) by: using their hand 114, providing a spoken utterance (e.g., "Assistant, show me nearby delivery options," and/or providing, within a threshold period of time, another input that indicates the user 110 intends to initialize an action associated with the selectable suggestion element 144.

In some implementations, the first suggestion model 126-A can remain available for assisting with generating suggestions while the second suggestion model 126-B is also available for assisting with generating suggestions. Other suggestion models 126 can also be available while the first suggestion model 126-A remains available, at least for use when processing data in furtherance of generating selectable suggestions and/or other content for assisting one or more users. For example, the second suggestion model 126-B can be available to the example computing device 112 as a test for determining an accuracy and/or a suitability of suggestions that are generated using the second suggestion model 126-B. While this testing is ongoing, the additional application 120 can utilize the first suggestion model 126-A, which can be a suggestion model that has reliably been utilized by the additional application 120 to provide suitable suggestion data prior to the testing. In this way, testing of various models will not interrupt reliable processes for generating suggestions—at least not until a model undergoing testing has historically been used to generate reliable suggestion data. For example, suggestion data can be considered reliable when one or more probabilities and/or scores for a particular suggestion characterized by the suggestion data satisfies a threshold. In some implementations, the second suggestion model 126-B can be designated as a replacement for the first suggestion model 126-A when the second suggestion model 126-B is determined to be useful for generating suggestions that are at least as suitable as those generated using the first suggestion model 126-A. For example, a degree of correlation between a suggestion generated using the second suggestion model 126-B and another suggestion generated using the first suggestion model 126-A can be determined. When the degree of correlation satisfies a threshold, the second suggestion model 126-B can be designated as the default suggestion model and/or replace the first suggestion model 126-A. Additionally, or alternatively, when the degree of correlation fails to satisfy the threshold, the second suggestion model 126-B can be further trained and/or can be further evaluated as the second suggestion model 126-B is continually tested.

In some implementations, when the user 110 selects the selectable suggestion element 144, feedback data 162 can be generated by the messaging application 102 and/or the additional application 120, and processed by the additional application 120. The feedback data 162 can be used to further refine an accuracy of a suggestion model, and/or further train a suggestion model. For example, in response to the user 110 selecting the selectable suggestion element 144 within a threshold period of time, the additional application 120 (e.g., an automated assistant) can be invoked and initialize an internet search for "nearby delivery options." When the additional application 120 identifies a search result for suggesting to the user 110, the additional application 120 can cause a link to the search result to be populated in the field 106 of the messaging application 102.

A selection of a suggestion(s) by the user 110 can be characterized by feedback data 162 that is provided from the messaging application 102 to the additional application 120. The feedback data 162 can then be processed by the additional application 120 and/or a separate application or device in order to further train the second suggestion model 126-B. In some implementations, the second suggestion model 126-B is trained using training data 164 that is generated by the additional application 120 based on the feedback data 162. Additionally, or alternatively, the second suggestion model 126-B can be further trained in order that suggestions, generated using the second suggestion model 126-B, will correspond to a probability that more frequently satisfies a threshold value. In some implementations, the second suggestion model 126-B can be accessible via a remote computing device that, with prior permission from users, is trained using feedback data from a variety of different client devices and/or a variety of different users. When the second suggestion model 126-B is determined to be sufficiently trained after testing, the second suggestion model 126-B can be designated for replacing the first suggestion model 126-A. In other words, when the second suggestion model 126-B is sufficiently trained, the second suggestion model 126-B can be designated as a "default" model for use when generating suggestion—instead of the first suggestion model 126-A being the "default" model.

Figure 2:
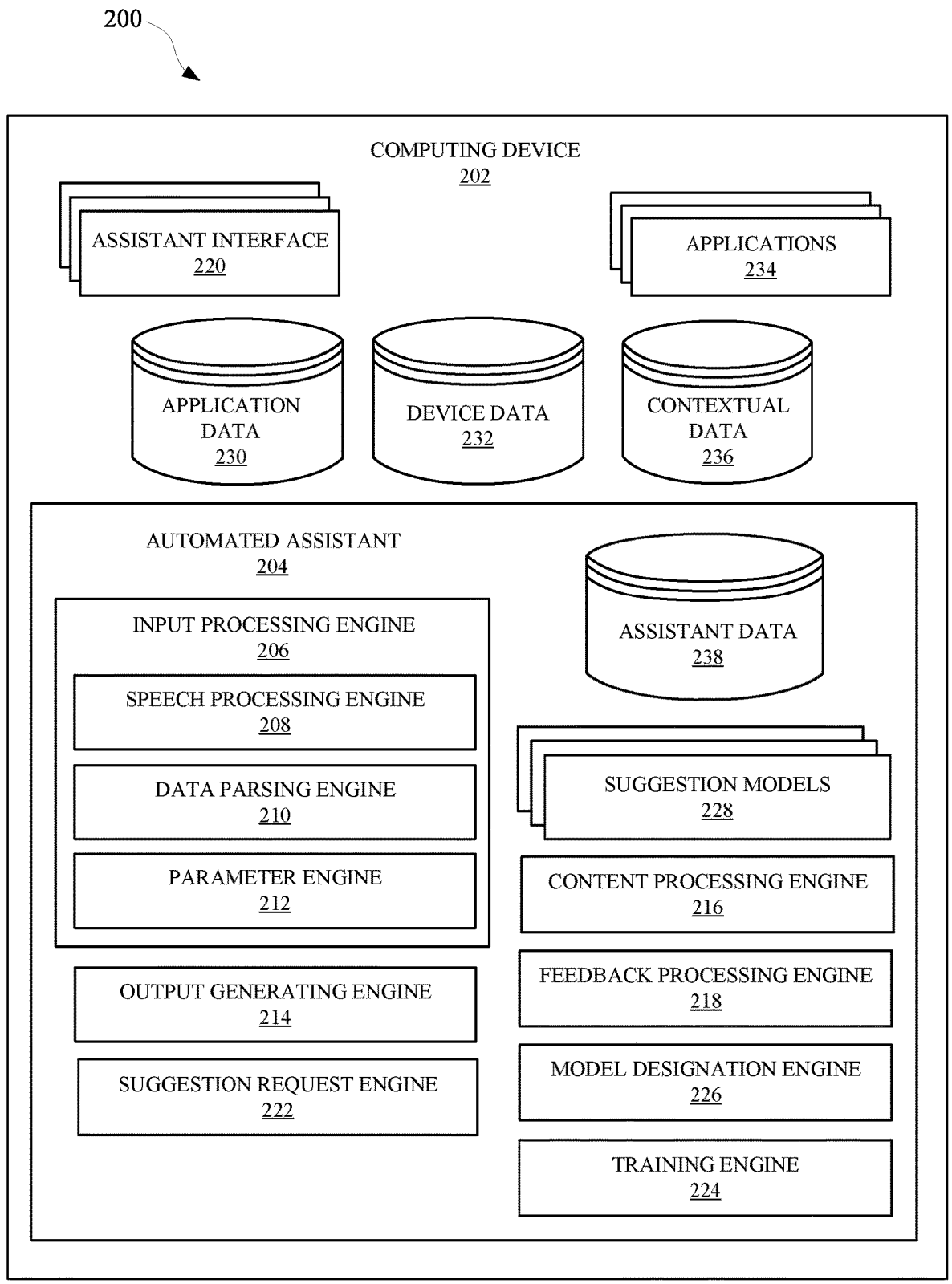
FIG. 2 illustrates a system that relates to selectively relying on additional suggestion model(s) when generating selectable suggestions, while also maintaining access to a default suggestion model.

FIG. 2 illustrates a system 200 that selectively relies on additional suggestion model(s) when generating selectable suggestions, while also maintaining access to and/or employing a default suggestion model. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204.

The computing device 202 can include a display device, which can be a display panel that includes a touch interface for receiving touch inputs and/or gestures for allowing a user to control applications 234 of the computing device 202 or another device via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202 when a network connection is available. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module. While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234.

In some implementations, the computing device 202 can include a suggestion request engine 222 that can process requests received from one or more applications 234 of the computing device 202 and/or a separate computing device. A request can cause the automated assistant 204 to identify one or more actions, content, and/or other data that can be suggested to the user. For example, a suggestion request can cause the suggestion request engine 222 to access content that is being rendered by an application that provided the suggestion request. Additionally, or alternatively, and with prior permission from the user, the suggestion request can cause the suggestion request engine 222 to access content that is currently, was previously, or will eventually be, rendered at an interface of the computing device 202. Content that is accessed by the suggestion request engine 222 can then be processed according to a suggestion process.

In some implementations, a suggestion process can be selected using a content processing engine 216, which can identify a particular suggestion process based on the suggestion request. For example, the content processing engine 216 can initially identify a suggestion process that was previously used to provide suggestions for the application 234 that provided the suggestion request. Additionally, or alternatively, the content processing engine 216 can initially identify a suggestion process that is designated as a default suggestion process for the application 234 that provided the suggestion request. The processing of the content, which can include application data 230, device data 232, and/or contextual data 236, can result in the generation of suggestion data. The suggestion data can characterize one or more suggestions that can be rendered at an interface of the computing device 202, in order to assist the user with initializing a particular action and/or accessing certain other content. However, in some instances, processing of the content using the default suggestion process may not result in any suggestions being identified.

When the content processing engine 216 has completed processing the content using an initial suggestion process (e.g., using a first suggestion model of suggestion models 228), the content processing engine 216 can process the content or other content using another suggestion model (e.g., a second suggestion model of the suggestion models 228). The other suggestion model can be, but is not limited to, a test model or experimental model that is employed by an entity to determine an accuracy of the other suggestion model. For example, a first suggestion model can be a default suggestion model that has been previously employed by the automated assistant 204 when generating suggestions, and a second suggestion model can be a model that was trained using different training data relative to training data that was used to train the first suggestion model. Additionally, or alternatively, the first suggestion model can be a different type of suggestion model than the second suggestion model.

When the content processing engine 216 processes the content using the other suggestion model, the content processing engine 216 can generate additional suggestion data. The additional suggestion data can characterize a suggestion that is the same or different from a suggestion that was identified based on processing the content using the initial suggestion process. The application that provided the suggestion request can receive each instance of suggestion data from the automated assistant 204 and selectively render one or more selectable suggestion elements using the suggestion data. Additionally, or alternatively, the automated assistant 204 can selectively render one or more selectable suggestion elements using the instances of suggestion data.

In some implementations, the automated assistant 204 can include a feedback processing engine 218, which can process input characterizing an interaction between the user and one or more selectable suggestion elements. The processing of the input can result in feedback data, which can be used by a model designation engine 226 to assign an accuracy value to a respective suggestion model. In some implementations, when an accuracy of the second suggestion model is determined to be greater than an accuracy of the first suggestion model, the automated assistant 204 can designate the second suggestion model as the "default" model. In some implementations, each model can be available at a separate server device, and each model can be trained according to feedback data from a variety of different users and/or a variety of their respective devices. Additionally, or alternatively, a training engine 224 can be provided at the automated assistant 204 in order to locally train each model according to feedback data generated by the feedback processing engine 218.

In some implementations, the second suggestion model can remain at the server computing device in order to preserve computational resources at a client computing device—at least until the second suggestion model has been qualified as accurate enough to be provided to a client computing device. Maintaining the "default" model at the client computing device can preserve computational resources, such as network bandwidth, which can otherwise be consumed by communicating data over various network connections to various server devices. Furthermore, maintaining the default model at the client computing device—without other experimental models at the client computing device, can mitigate latency between generating suggestions, because experimenting with other models would not be performed exclusively at the client computing device. Therefore, by limiting hosting of certain models to be at the server computing device, the computational resources of the client computing device, such as memory and processing bandwidth, can be preserved.

In some implementations, the model designation engine 226 can generate and/or modify model data that characterizes a suitability of a particular model for use when generating selectable suggestions associated with an application. The model designation engine 226 can modify model data associated with a particular suggestion model based on feedback data that was generated based on an interaction between a user and a selectable suggestion element. When the interaction is determined to be a positive interaction and/or when corresponding feedback data is determined to satisfy a threshold, the model data can be modified to reflect this determination. Additionally, or alternatively, when the feedback data for one or more interactions is determined to satisfy a threshold, the model data can be modified to designate the corresponding suggestion model as a default suggestion model. Additionally, or alternatively, when the interaction is determined to be a negative interaction and/or when corresponding data is determined to not satisfy a threshold, the model data can be modified to reflect this determination. Additionally, or alternatively, when the feedback data for one or more interactions is determined to not satisfy a threshold, the model data can be modified to further characterize the corresponding suggestion model as being less accurate when used to generate suggestions. Changes in model data can then be used to rank certain models over others, and eventually designate a most accurate model as a default model for use when generating suggestions for a particular application and/or multiple applications.

Figure 3A:
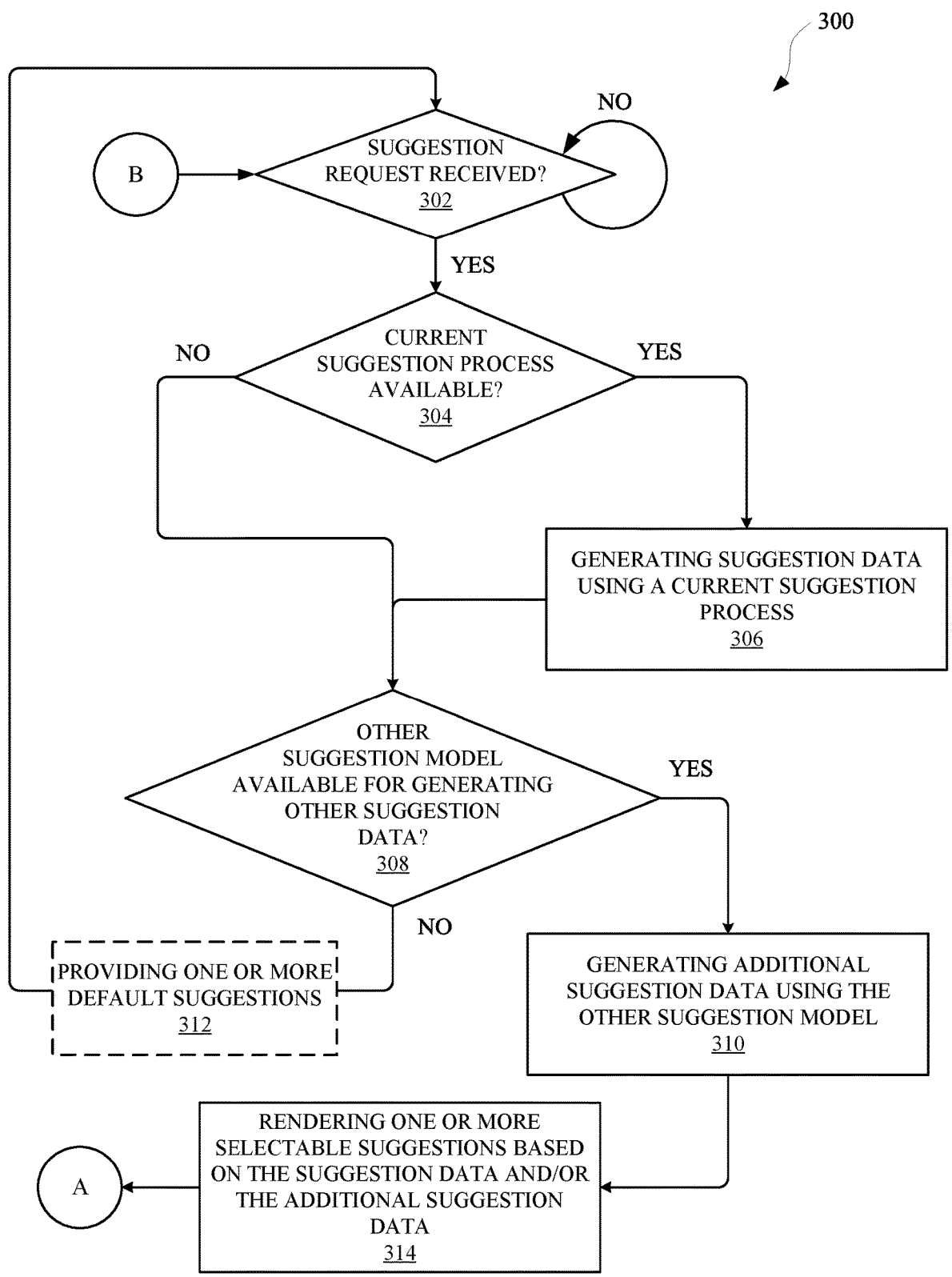
FIG. 3A and FIG. 3B illustrate a method for retaining usage of a default suggestion model while allowing other models to be employed for determining accuracy of the other models.
Figure 3B:
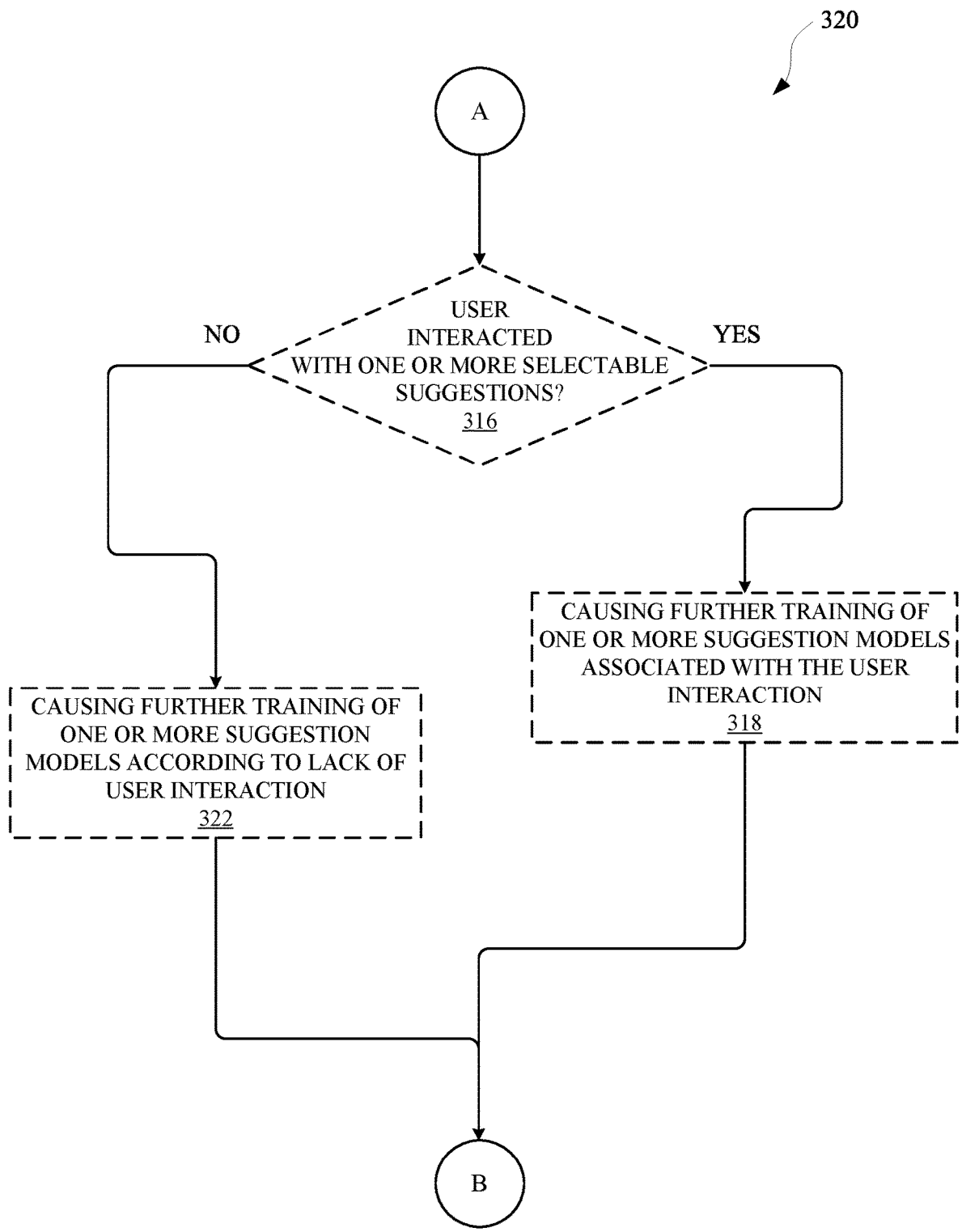

FIG. 3A and FIG. 3B illustrate a method 300 and a method 320 for retaining usage of a default suggestion model while allowing other models to be employed for determining accuracy of the other models. The method 300 can be performed by one or more computing devices, applications, and/or any other apparatus or module that can be associated with an automated assistant. The method 300 can include an operation 302 of determining whether a suggestion request has been received. The suggestion request can be received from an application that a user is interacting with, and the suggestion request can be received by an additional application, such as an automated assistant or another application. The suggestion request can include data that causes the automated assistant to process the suggestion request using a suggestion model in furtherance of the automated assistant providing suggestion data back to the application.

When a suggestion request is determined to have been received, the method 300 can proceed to an operation 304, otherwise the additional application can continue to determine whether a suggestion request has been received. The operation 304 can include determining whether a current suggestion process is available for generating suggestions for the application. A current suggestion process can be a process that includes processing application content using a set of rules, one or more machine learning models, and/or any other apparatus or module for generating suggestion data for the application. When a current suggestion process is not available for generating suggestions, the method 300 can proceed to an operation 308. Otherwise, when the current suggestion process is available, the method 300 can proceed to an operation 306.

The operation 306 can include generating suggestion data using the current suggestion process. For example, the current suggestion process can include processing application content (e.g., a screen shot of a display of a computing device) using one or more rules, models, and/or other process data in order to generate suggestion data. The method 300 can then proceed to the operation 308, which can include determining whether there is another suggestion model available for use when processing application content to generate other suggestion data. The other suggestion model can be, but is not limited to, a backup or "fallback" suggestion model that can be used regardless of whether the suggestion process results in any suggestions being generated. In some implementations, the other suggestion model can be available at: the application, the additional application (e.g., an automated assistant), and/or a separate computing device in furtherance of further training the other suggestion model prior to deploying the other suggestion model across various devices.

When another suggestion model is determined to be available, the method 300 can proceed to an operation 310, which can include generating additional suggestion data using the other suggestion model. When generating the additional suggestion data, the additional application can use the other suggestion model and application content, which can be the same or different than the application content than was what used with the current suggestion process of operation 306. For example, the application content used with the other suggestion model can be a screen shot, whereas the other application content used with the current suggestion process may not include the screen shot. Rather, the other application content used with the current suggestion process can include a different screen shot and/or different application data that is accessible to the application and/or the additional application.

When another suggestion is determined to not be available, the method 300 can optionally proceed from the operation 308 to an optional operation 312, which can include providing one or more default suggestions. A default suggestion can be, but is not limited to, a selectable suggestion element that, when selected, causes the additional application to initialize and perform a default action. For example, the default action can be to audibly and/or visually query the user regarding what the user would like assistance with (e.g., "What can I help you with?"). Additionally, or alternatively, the default action can be to access a separate device and/or application, and/or access the internet. Thereafter, the method 300 can proceed to the operation 302 and continue to monitor for suggestion requests.

When the operation 310 is performed, the method 300 can proceed from the operation 310 to an operation 314, which can include causing the application to render one or more selectable suggestion elements based on the suggestion data and/or the additional suggestion data generated. For example, the selectable element(s) can be rendered by the application or the additional application, and, when selected, can cause the application and/or the additional application to initialize performance of one or more actions. The method 300 can continue from operation 314, via continuation element "A" (encircled at method 300 of FIG. 3A) to continuation element "A" (encircled at method 320 of FIG. 3B), to an optional operation 316.

The optional operation 316 can include determining whether the user interacted with one or more selectable suggestion elements rendered according to the operation 314. When the user is determined to have interacted with one or more selectable suggestion elements, the method 300 can proceed from the operation 316 to an optional operation 318, which can include causing further training of one or more suggestion models according to the user interaction. The one or more suggestion models that are further trained according to operation 318 can correspond to one or more respective models that were used to generate one or more suggestion elements that the user interacted with. When the user is determined to not have interacted with the one or more selectable suggestions, the method 300 can proceed to an optional operation 322. The optional operation 322 can include causing further training one or more suggestion models according to the lack of user interaction. The one or more suggestion models that are further trained according to the operation 322 can correspond to one or more respective models that were used to generate one or more suggestion elements that the user did not interact with.

In some implementations, the operation 316 can be an optional operation of determining a correlation between suggestion data generated according to the current suggestion process and additional suggestion data generated using the other suggestion model. Thereafter, the other suggestion model can be trained according to whether a degree of correlation satisfies a threshold. Additionally, or alternatively, the other suggestion model can be trained according to whether the user interacted with a selectable suggestion element that was generated using the other suggestion model. In this way, the other suggestion model can be trained to provide suggestions that would otherwise be provided via a current suggestion process, and also trained to provide suggestions that a user is more likely to interact with—thereby encouraging the user to employ the additional application to perform actions that preserve computational resources. The method 300 can proceed, via continuation element "B" to the operation 302 in order to continue to determine whether a suggestion request has been received from the application.

Figure 4:
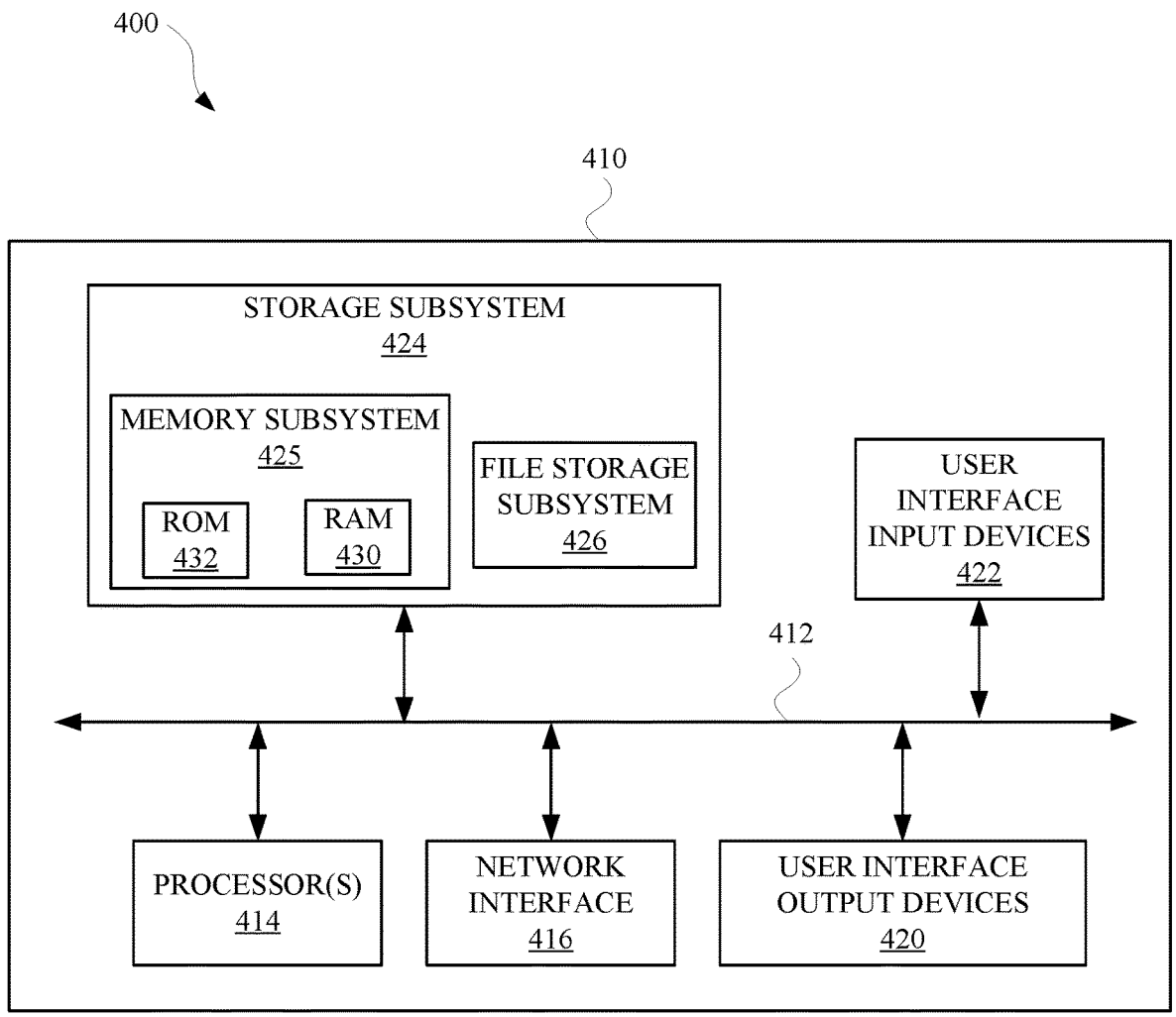
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, example computing device 112, messaging application 102, additional application 120, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as: receiving a request to generate suggestion data using application content, wherein the application content is generated by an application that is accessible via a computing device. The method can further include an operation of processing, in response to receiving the request, the application content using a first suggestion model to generate the suggestion data. The method can further include an operation of determining, based on processing the application content, whether the suggestion data is insufficient for rendering at an interface of the computing device. The method can further include an operation of, when the suggestion data is determined to be insufficient for rendering at the interface of the computing device: causing the application content to be processed using a second suggestion model in furtherance of generating additional suggestion data, wherein the first suggestion model is assigned as a default suggestion model with respect to generating selectable suggestions associated with the application. The method can further include an operation of determining that the additional suggestion data is sufficient for rendering at the interface of the computing device, and causing the computing device to render one or more selectable suggestions that are based on the additional suggestion data.

In some implementations, the method can further include an operation of, when the suggestion data is determined to be insufficient for rendering at the interface of the computing device: processing feedback data that characterizes an interaction between a user and the one or more selectable suggestions that are based on the additional suggestion data, and determining, based on processing the feedback data, whether the interaction between the user and the one or more selectable suggestions resulted in a selection of a particular selectable suggestion of the one or more selectable suggestions. In some implementations, the method can further include an operation of, when the suggestion data is determined to be insufficient for rendering at the interface of the computing device, and when the interaction between the user and the one or more selectable suggestions resulted in the selection of the particular selectable suggestion: causing the second suggestion model to be assigned as the default suggestion model with respect to generating selectable suggestions associated with the application.

In some implementations, the method can further include an operation of, when the suggestion data is determined to be insufficient for rendering at the interface of the computing device, and when the interaction between the user and the one or more selectable suggestions resulted in the selection of the particular selectable suggestion: causing, based on the selection of the particular selectable suggestion by the user, the first suggestion model to no longer be assigned as the default suggestion model. The method can further include an operation of, when the suggestion data is determined to be insufficient for rendering at the interface of the computing device, and when the interaction between the user and the one or more selectable suggestions resulted in the selection of the particular selectable suggestion: causing the first suggestion model and the second suggestion model to both be designated for use when providing subsequent selectable suggestions for the application. In some implementations, the method can further include an operation of, when the suggestion data is determined to be insufficient for rendering at the interface of the computing device: processing feedback data that characterizes an interaction between a user and the one or more selectable suggestions that are based on the additional suggestion data, and determining, based on processing the feedback data, whether to assign the second suggestion model as the default suggestion model instead of the first suggestion model or whether to use the second suggestion model as an additional default suggestion model in combination with the first suggestion model.

In some implementations, the method can further include an operation of, when the suggestion data is determined to be insufficient for rendering at the interface of the computing device, and when the second suggestion model is determined to be assigned as the default suggestion model or the additional default suggestion model: causing the second suggestion model to be assigned as the default suggestion model, or the additional default suggestion model, with respect to generating selectable suggestions associated with the application. In some implementations, the method can further include an operation of, when the suggestion data is determined to be insufficient for rendering at the interface of the computing device, and when the second suggestion model is determined to be assigned as the default suggestion model or the additional default suggestion model: causing the second suggestion model to be provided from a server computing device to the computing device, wherein the first suggestion model is stored at the computing device. In some implementations, the method can further include an operation of, when the suggestion data is determined to be insufficient for rendering at the interface of the computing device, and when the feedback data fails to satisfy the threshold for assigning the second suggestion model as the default suggestion model: modifying, based on the feedback data failing to satisfy the threshold, model data that characterizes suitability of the second suggestion model for use when generating selectable suggestions associated with the application.

In some implementations, causing the application content to be processed using the second suggestion model includes: communicating the application content to a server computing device, wherein the server computing device provides access to the second suggestion model. In some implementations, the method can further include an operation of, when the suggestion data is determined to be sufficient for rendering at the interface of the computing device: causing the computing device to render one or more other selectable suggestions that are based on the suggestion data, and causing the application content to be processed using the second suggestion model in furtherance of generating the additional suggestion data. In some implementations, the method can further include an operation of, when the suggestion data is determined to be sufficient for rendering at the interface of the computing device: determining a degree of correlation between the additional suggestion data generated using the second suggestion model and the suggestion data generated using the first suggestion model.

In some implementations, the method can further include an operation of, when the suggestion data is determined to be sufficient for rendering at the interface of the computing device: modifying, based on the degree of correlation, model data that characterizes suitability of the second suggestion model, relative to other models, for use when generating selectable suggestions associated with the application. The method can further include an operation of, when the suggestion data is determined to be insufficient for rendering at the interface of the computing device: determining a respective correlation between the application content and one or more additional suggestion models of other suggestion models that are accessible to the computing device, and identifying the second suggestion model based on a degree of correlation for the second suggestion model relative to other degrees of correlation between the application content and the other suggestion models.

In some implementations, the method can further include an operation of, when the suggestion data is determined to be insufficient for rendering at the interface of the computing device: determining a respective correlation between the application and one or more additional suggestion models of other suggestion models that are accessible to the computing device, and identifying the second suggestion model based on a degree of correlation for the second suggestion model relative to other degrees of correlation between the application and the other suggestion models. In some implementations, the second suggestion model is a multi-domain neural network model. In some implementations, the method can further include an operation of accessing, in response to receiving the request, the application content, wherein the application content characterizes one or more operations being performed by the application, and wherein an operation of the one or more operations includes rendering a graphical user interface that includes content generated during an interaction between the user and another user. In some implementations, the request is received by an automated assistant that is responsive to spoken utterances from the user. In some implementations, the additional suggestion data characterizes one or more assistant actions capable of being initialized via the automated assistant.

In yet other implementations, a method implemented by one or more processors is set forth as including operations such as processing, by a first application, application content according to a suggestion generating process for generating first suggestion data, wherein the application content is at least partially provided via a second application that is being accessed by a user via a computing device, and wherein the suggestion generating process has been previously utilized to generate selectable suggestions that are based on other application content previously provided via the second application. In some implementations, the method can further include an operation of processing, by the first application, the application content using a suggestion model for generating second suggestion data, wherein the suggestion generating process is different than processing the application content using the suggestion model, and wherein the suggestion model was not previously used to process the other application content previously provided via the second application. In some implementations, the method can further include an operation of causing, by the first application, an interface of the computing device to render: a first selectable suggestion element that is based on the first suggestion data and the suggestion generating process, and a second selectable suggestion element that is based on the second suggestion data and the suggestion model.

In some implementations, processing the application content according to the suggestion generating process includes: accessing an image of graphical content that is being rendered at a graphical user interface of the computing device, wherein the first selectable suggestion element is different from the second selectable suggestion element.

In yet other implementations, a method implemented by one or more processors is set forth as including operations such as causing, by an application, an interface of a computing device to render content that is based on an interaction between a user and the application. The method can further include an operation of receiving, from an additional application, suggestion data that characterizes one or more actions capable of being performed by the additional application, wherein the suggestion data is generated using a suggestion generating process that has been previously utilized to generate selectable suggestions using prior application content of the application. The method can further include an operation of receiving, from the additional application, additional suggestion data that characterizes one or more other actions capable of being performed by the additional application, wherein the additional suggestion data is generated using a suggestion model that was not previously available to the additional application to generate the selectable suggestions from the prior application content. The method can further include an operation of causing, by the application, the interface of the computing device to render: a first selectable suggestion element that is based on the suggestion data, wherein a selection of the first selectable suggestion element by the user causes the additional application to initialize performance of the one or more actions, and a second selectable suggestion element that is based on the additional suggestion data, wherein a separate selection of the second selectable suggestion element by the user causes the additional application to initialize performance of the one or more other actions.

In some implementations, the method can further include an operation of, subsequent to causing the interface of the computing device to render the first selectable suggestion element and the second selectable suggestion element: causing, in response to the user interacting with the second selectable suggestion element, the additional application to continue to employ the suggestion model when generating subsequent suggestion data for the application. In some implementations, the method can further include an operation of, subsequent to causing the interface of the computing device to render the first selectable suggestion element and the second selectable suggestion element: causing, in response to the user not interacting with the second selectable suggestion element within a threshold period of time, the additional application to no longer employ the suggestion model when generating further suggestion data for the application.

I claim:

1. A method implemented by one or more processors, the method comprising:
   receiving a request to generate suggestion data using application content, wherein the application content is generated by an application that is accessible via a computing device;
   processing, at the computing device and in response to receiving the request, the application content using a first suggestion model to generate the suggestion data, wherein the first suggestion model is stored at the computing device;
   determining, based on processing the application content, whether the suggestion data is insufficient for rendering at an interface of the computing device; and
   when the suggestion data is determined to be insufficient for rendering at the interface of the computing device:
      causing the application content to be processed, at a remote computing device and using a second suggestion model stored at the remote computing device, in furtherance of generating additional suggestion data,
         wherein the first suggestion model is assigned as a default suggestion model with respect to generating selectable suggestions associated with the application,
      determining that the additional suggestion data is sufficient for rendering at the interface of the computing device, and
      causing the computing device to render one or more selectable suggestions that are based on the additional suggestion data;
   providing feedback data that characterizes an interaction between a user and the one or more selectable suggestions that are based on the additional suggestion data;
   subsequent to providing feedback data that characterizes the interaction between the user and the one or more selectable suggestions that are based on the additional suggestion data:
      receiving, at the computing device and based on providing the feedback data, the second suggestion model,
         wherein receiving the second suggestion model at the computing device causes the second suggestion model to be stored at the computing device and used, at the computing device, as the default suggestion model instead of the first suggestion model.

2. The method of claim 1, further comprising:
   when the suggestion data is determined to be insufficient for rendering at the interface of the computing device:
      processing feedback data that characterizes an interaction between a user and the one or more selectable suggestions that are based on the additional suggestion data, and
      determining, based on processing the feedback data, whether the interaction between the user and the one or more selectable suggestions resulted in a selection of a particular selectable suggestion of the one or more selectable suggestions.

3. The method of claim 2, further comprising:
   when the suggestion data is determined to be insufficient for rendering at the interface of the computing device, and
   when the interaction between the user and the one or more selectable suggestions resulted in the selection of the particular selectable suggestion:
      causing the second suggestion model to be assigned as the default suggestion model with respect to generating selectable suggestions associated with the application.

4. The method of claim 2, further comprising:
   when the suggestion data is determined to be insufficient for rendering at the interface of the computing device, and
   when the interaction between the user and the one or more selectable suggestions resulted in the selection of the particular selectable suggestion:

causing, based on the selection of the particular selectable suggestion by the user, the first suggestion model to no longer be assigned as the default suggestion model.

5. The method of claim 2, further comprising:
when the suggestion data is determined to be insufficient for rendering at the interface of the computing device, and
when the interaction between the user and the one or more selectable suggestions resulted in the selection of the particular selectable suggestion:
causing the first suggestion model and the second suggestion model to both be designated for use when providing subsequent selectable suggestions for the application.

6. The method of claim 1, further comprising:
when the suggestion data is determined to be insufficient for rendering at the interface of the computing device:
processing feedback data that characterizes an interaction between a user and the one or more selectable suggestions that are based on the additional suggestion data, and
determining, based on processing the feedback data, whether to assign the second suggestion model as the default suggestion model instead of the first suggestion model or whether to use the second suggestion model as an additional default suggestion model in combination with the first suggestion model.

7. The method of claim 6, further comprising:
when the suggestion data is determined to be insufficient for rendering at the interface of the computing device, and
when the second suggestion model is determined to be assigned as the default suggestion model or the additional default suggestion model:
causing the second suggestion model to be assigned as the default suggestion model, or the additional default suggestion model, with respect to generating selectable suggestions associated with the application.

8. The method of claim 6, further comprising:
when the suggestion data is determined to be insufficient for rendering at the interface of the computing device, and
when the feedback data fails to satisfy the threshold for assigning the second suggestion model as the default suggestion model:
modifying, based on the feedback data failing to satisfy the threshold, model data that characterizes suitability of the second suggestion model for use when generating selectable suggestions associated with the application.

9. The method of claim 1, wherein causing the application content to be processed using the second suggestion model includes:
communicating the application content to a server computing device,
wherein the server computing device provides access to the second suggestion model.

10. The method of claim 1, further comprising:
when the suggestion data is determined to be sufficient for rendering at the interface of the computing device:
causing the computing device to render one or more other selectable suggestions that are based on the suggestion data, and
causing the application content to be processed using the second suggestion model in furtherance of generating the additional suggestion data.

11. The method of claim 10, further comprising:
when the suggestion data is determined to be sufficient for rendering at the interface of the computing device:
determining a degree of correlation between the additional suggestion data generated using the second suggestion model and the suggestion data generated using the first suggestion model.

12. The method of claim 11, further comprising:
when the suggestion data is determined to be sufficient for rendering at the interface of the computing device:
modifying, based on the degree of correlation, model data that characterizes suitability of the second suggestion model, relative to other models, for use when generating selectable suggestions associated with the application.

13. The method of claim 1, further comprising:
when the suggestion data is determined to be insufficient for rendering at the interface of the computing device:
determining a respective correlation between the application content and one or more additional suggestion models of other suggestion models that are accessible to the computing device, and
identifying the second suggestion model based on a degree of correlation for the second suggestion model relative to other degrees of correlation between the application content and the other suggestion models.

14. The method of claim 1, further comprising:
when the suggestion data is determined to be insufficient for rendering at the interface of the computing device:
determining a respective correlation between the application and one or more additional suggestion models of other suggestion models that are accessible to the computing device, and
identifying the second suggestion model based on a degree of correlation for the second suggestion model relative to other degrees of correlation between the application and the other suggestion models.

15. A non-transitory computer-readable storage medium storing instructions that cause at least one processor to:
receive a request to generate suggestion data using application content,
wherein the application content is generated by an application that is accessible via a computing device;
process, at the computing device and in response to receiving the request, the application content using a first suggestion model to generate the suggestion data;
wherein the first suggestion model is stored at the computing device;
determine, based on processing the application content, whether the suggestion data is insufficient for rendering at an interface of the computing device; and
when the suggestion data is determined to be insufficient for rendering at the interface of the computing device:
cause the application content to be processed, at a remote computing device and using a second suggestion model, stored at the remote computing device, in furtherance of generating additional suggestion data,
wherein the first suggestion model is assigned as a default suggestion model with respect to generating selectable suggestions associated with the application, determine, based on feedback data that characterizes an interaction between a user and the one or more selectable suggestions that are based on the additional suggestion data, to assign the second suggestion model as the default suggestion model instead of the first suggestion model; and in response to determining to assign the second suggestion model as the default suggestion model:
cause the second suggestion model to be stored at the computing device and used, at the computing device, as the default suggestion model instead of the first suggestion model.

16. The non-transitory computer-readable storage medium of claim 15 further storing instructions that cause the at least one processor to:

when the suggestion data is determined to be insufficient for rendering at the interface of the computing device:
process feedback data that characterizes an interaction between a user and the one or more selectable suggestions that are based on the additional suggestion data, and
determine, based on processing the feedback data, whether the interaction between the user and the one or more selectable suggestions resulted in a selection of a particular selectable suggestion of the one or more selectable suggestions.

17. The non-transitory computer-readable storage medium of claim 15 further storing instructions that cause the at least one processor to:

when the suggestion data is determined to be insufficient for rendering at the interface of the computing device, and
when the interaction between the user and the one or more selectable suggestions resulted in the selection of the particular selectable suggestion:
cause the second suggestion model to be assigned as the default suggestion model with respect to generating selectable suggestions associated with the application.

18. The non-transitory computer-readable storage medium of claim 15 further storing instructions that cause the at least one processor to:

when the suggestion data is determined to be insufficient for rendering at the interface of the computing device, and
when the interaction between the user and the one or more selectable suggestions resulted in the selection of the particular selectable suggestion:
cause, based on the selection of the particular selectable suggestion by the user, the first suggestion model to no longer be assigned as the default suggestion model.

19. The non-transitory computer-readable storage medium of claim 15 further storing instructions that cause the at least one processor to:

when the suggestion data is determined to be insufficient for rendering at the interface of the computing device, and
when the interaction between the user and the one or more selectable suggestions resulted in the selection of the particular selectable suggestion:
cause the first suggestion model and the second suggestion model to both be designated for use when providing subsequent selectable suggestions for the application.

20. A system including memory and one or more processors operable to execute instructions in memory, comprising instructions to:

receive a request to generate suggestion data using application content,
wherein the application content is generated by an application that is accessible via a computing device;
process, at the computing device and in response to receiving the request, the application content using a first suggestion model to generate the suggestion data,
wherein the first suggestion model is stored at the computing device;
determine, based on processing the application content, whether the suggestion data is insufficient for rendering at an interface of the computing device; and
when the suggestion data is determined to be insufficient for rendering at the interface of the computing device:
cause the application content to be processed, at a remote computing device and using a second suggestion model stored at the remote computing device, in furtherance of generating additional suggestion data,
wherein the first suggestion model is assigned as a default suggestion model with respect to generating selectable suggestions associated with the application,
determine that the additional suggestion data is sufficient for rendering at the interface of the computing device, and
cause the computing device to render one or more selectable suggestions that are based on the additional suggestion data;
determine, based on feedback data that characterizes an interaction between a user and the one or more selectable suggestions that are based on the additional suggestion data, to assign the second suggestion model as the default suggestion model instead of the first suggestion model; and
in response to determining to assign the second suggestion model as the default suggestion model:
cause the second suggestion model to be stored at the computing device and used, at the computing device, as the default suggestion model instead of the first suggestion model.

* * * * *